(12) United States Patent
Vanderdys

(10) Patent No.: US 10,285,381 B2
(45) Date of Patent: May 14, 2019

(54) DOG GROOMING TABLE BARRIER

(71) Applicant: Brenda M Vanderdys, Houston, TX (US)

(72) Inventor: Brenda M Vanderdys, Houston, TX (US)

(*) Notice: Subject to any disclaimer, the term of this patent is extended or adjusted under 35 U.S.C. 154(b) by 241 days.

(21) Appl. No.: 15/603,306

(22) Filed: May 23, 2017

(65) Prior Publication Data

US 2017/0332606 A1 Nov. 23, 2017

Related U.S. Application Data

(60) Provisional application No. 62/340,052, filed on May 23, 2016.

(51) Int. Cl.
*A01K 15/04* (2006.01)
*A01K 13/00* (2006.01)
*A47B 13/08* (2006.01)

(52) U.S. Cl.
CPC ............. *A01K 15/04* (2013.01); *A01K 13/00* (2013.01); *A01K 13/001* (2013.01); *A47B 13/083* (2013.01)

(58) Field of Classification Search
CPC ...... A01K 15/04; A01K 13/00; A01K 13/001; A47B 13/083
USPC .................................................. 119/754, 753
See application file for complete search history.

(56) References Cited

U.S. PATENT DOCUMENTS

| | | | | |
|---|---|---|---|---|
| 4,470,718 A * | 9/1984 | Cwik | ................... | A47B 13/083 403/402 |
| 5,488,926 A * | 2/1996 | Hunt | ..................... | A01K 15/04 119/756 |
| 6,553,943 B1 * | 4/2003 | Murphy | ............... | A01K 13/001 119/673 |
| 2007/0039559 A1 * | 2/2007 | Foster | .................. | A01K 13/001 119/676 |
| 2007/0295285 A1 * | 12/2007 | Smith | .................... | A01K 13/00 119/753 |
| 2010/0300367 A1 * | 12/2010 | Askinasi | ............... | A01K 1/0107 119/161 |
| 2013/0025545 A1 * | 1/2013 | Munoz | ................. | A01K 1/0613 119/756 |
| 2013/0213318 A1 * | 8/2013 | Katz | .................... | A01K 13/001 119/754 |
| 2017/0118954 A1 * | 5/2017 | Hickman | ............. | A01K 13/001 |

* cited by examiner

*Primary Examiner* — Trinh T Nguyen

(57) ABSTRACT

A dog grooming table barrier is an apparatus that physically and visually alerts a dog of the edges of the grooming table. The apparatus includes a plurality of wall segments, at least one first clamp, and at least one second clamp. The plurality of wall segments surrounds the edges of the grooming table. The at least one first clamp and the at least one second clamp attaches the plurality of wall segments to the dog grooming table. The plurality of wall segments comprises a first end segment and a second end segment which surround the distal edges of the plurality of wall segments. The plurality of wall segments is arranged into a closed-shape configuration. A plurality of interlocking fasteners connects each of the plurality of wall segments to each other. The apparatus further includes a cantilever-receiving channel in order to accommodate the grooming arm of the grooming table.

12 Claims, 5 Drawing Sheets

DOG GROOMING TABLE BARRIER

The current application claims a priority to the U.S. Provisional Patent application Ser. No. 62/340,052 filed on May 23, 2016.

FIELD OF THE INVENTION

The present invention relates generally to dog grooming table barriers. More specifically, the present invention is a modular dog grooming table barrier that is mountable onto a variety of grooming tables.

BACKGROUND OF THE INVENTION

Grooming tables typically consist of an elevated surface with an adjustable arm. A removable grooming noose is secured onto the adjustable arm and wraps around the neck of a dog. The elevated table is for a groomer's benefit as the increased height of the table lessens the physical strain on the groomer. The grooming arm and grooming noose also aids the groomer as the noose holds the dog steady on the table. The grooming noose however is able to only guide the desired position of the pet on the table. Dogs may easily injure themselves by slipping past the edges of the table and choke. Groomers, therefore, must hold the dog in place while grooming the dog.

The present invention serves to provide a safe and comfortable grooming environment for both the dog and the groomer. Dogs feel safe as they can both physically see and feel the boundaries of the grooming table. As a result, dogs feel much calmer and remain still. Groomers need not hold onto the dog while grooming, and the groomer may focus on the job at hand. The present invention is also a universal grooming table accessory and accommodates dogs of varying heights. The modular construction of the present invention allows groomers to easily interchange the present invention in order to accommodate various dogs.

DETAILED DESCRIPTION OF THE INVENTION

All illustrations of the drawings are for the purpose of describing selected versions of the present invention and are not intended to limit the scope of the present invention.

Figure 1:
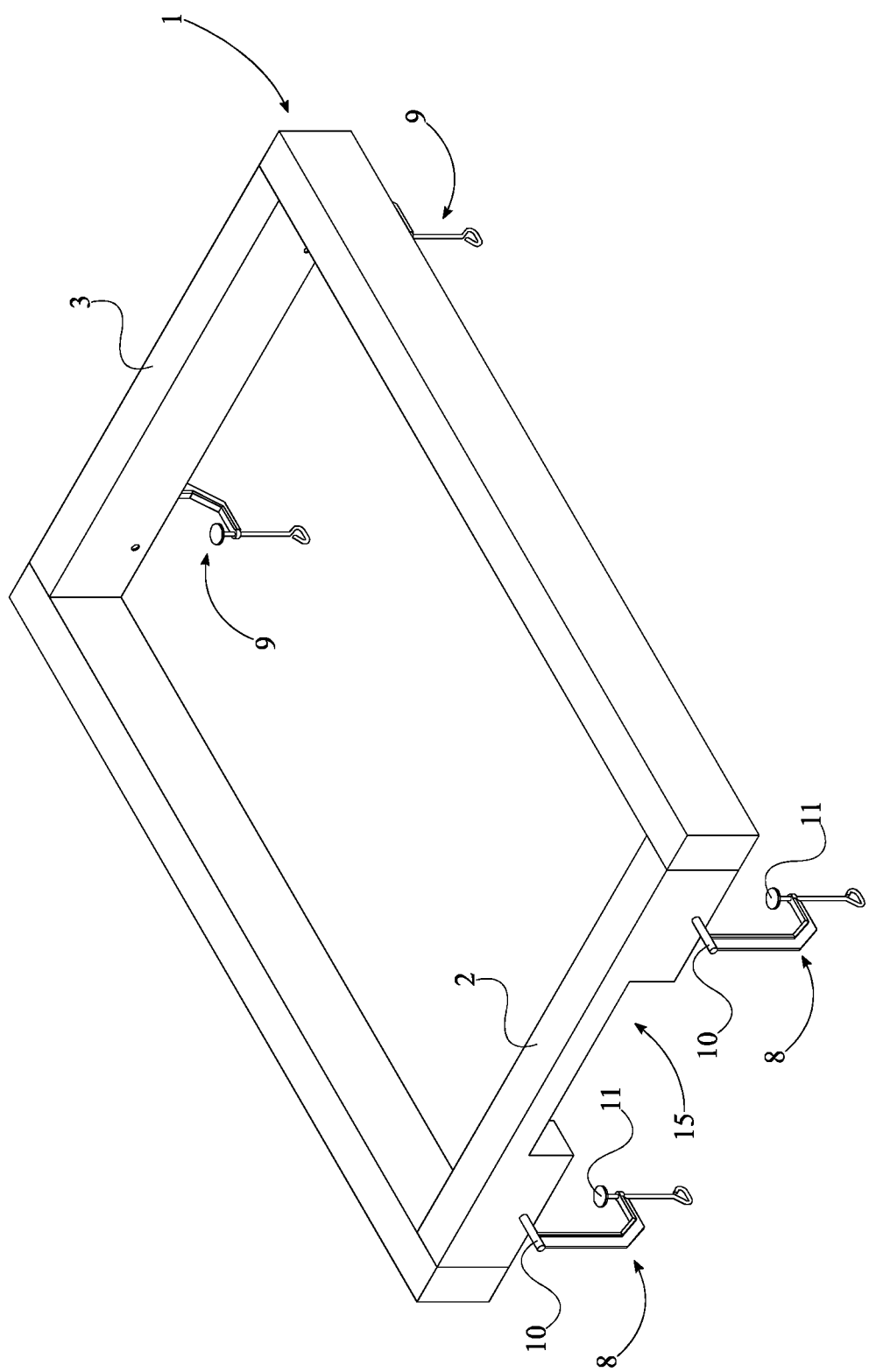
FIG. 1 is a perspective view of the present invention.

The dog grooming table barrier provides a safe and comfortable environment for a dog while on a grooming table. The present invention is a universal attachment for dog grooming tables that may vary in height in order to accommodate various dogs. The present invention is modular for easy removal, installation, and storage. As shown in FIG. 1, the present invention comprises a plurality of wall segments 1, at least one first clamp 8, and at least one second clamp 9. The plurality of wall segments 1 physically and visually alerts the dog from accidentally slipping past the edge of the dog grooming table. The plurality of wall segments 1 comprises a first end segment 2 and a second end segment 3. The first end segment 2 and the second end segment 3 encloses the dog grooming table along the distal edges of the grooming table. The at least one clamp and the at least second clamp secures the plurality of wall segments 1 to the dog grooming table so that the dog is not able to push the plurality of walls past the edges of the dog grooming table. The at least one first clamp 8 and the at least one second clamp 9 each comprises a proximal jaw 10 and a distal jaw 11. The proximal jaw 10 attaches the first end segment 2 and the second end segment 3 to the plurality of wall segments 1. The distal jaw 11 secures the plurality of wall segments 1 onto the dog grooming table.

Figure 4:
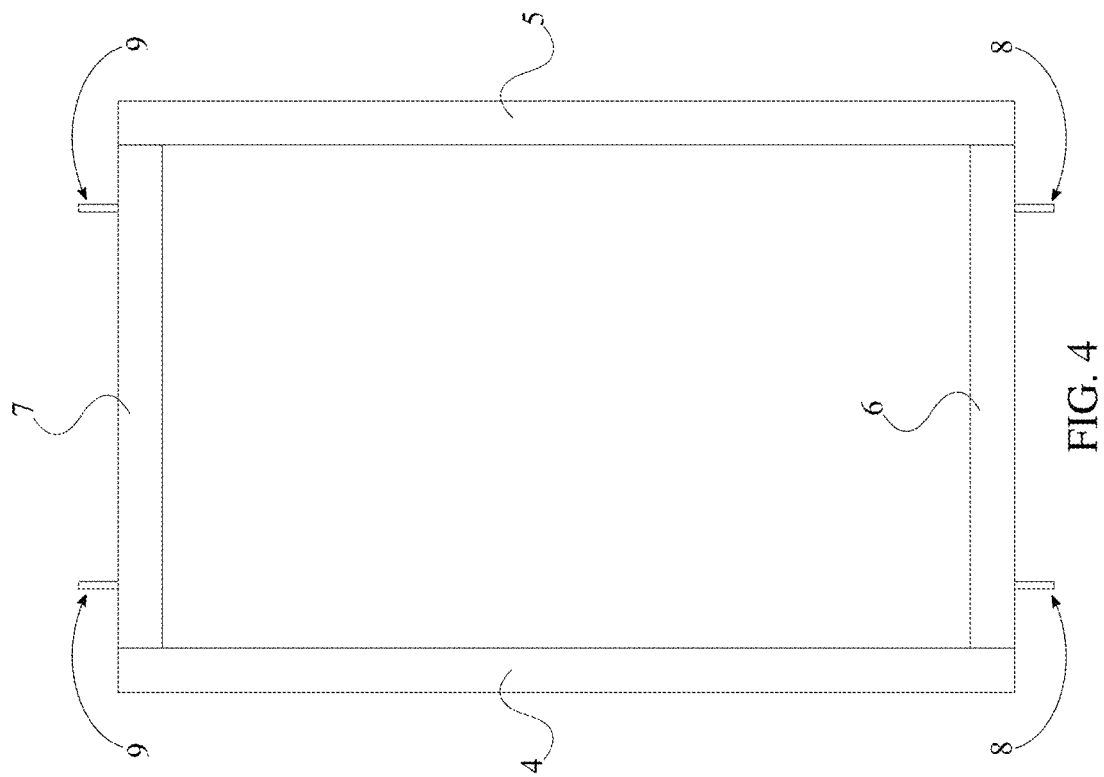
FIG. 4 is a top side perspective view of the present invention.

The overall configuration of the aforementioned components allows a user to easily align with and securely mount the present invention onto a grooming table. The plurality of wall segments 1 is arranged into a closed-shape configuration as to prevent a dog from slipping past the edge of the dog grooming table. The closed-shape configuration is seen in the perspective view of FIG. 1 and the top side view of FIG. 4. The plurality of wall segments 1 is terminally and detachably to each other in order to accommodate various shaped tables. The first end segment 2 and the second end segment 3 are positioned opposite each other about the closed-shape configuration in order to define the positioning of the other wall segments within the closed-shape configuration. The proximal jaw 10 of the at least one first clamp 8 is engaged to the first end segment 2, and the proximal jaw 10 of the at least one second clamp 9 is engaged to the second end segment 3. This configuration securely attaches the at least one first clamp 8 and the at least one second clamp 9 to the plurality of wall segments 1, and consequently, secures the plurality of wall segments 1 onto the grooming table. The distal jaw 11 presses against the surface of the table, opposite the surface adjacent the plurality of wall segments 1. Thus, the proximal jaw 10 and the distal jaw 11 of both the at least one first clamp 8 and the at least one second clamp 9 clamp onto the dog grooming table and push the first end segment 2 and the second end segment 3 onto the dog grooming table.

Figure 3:
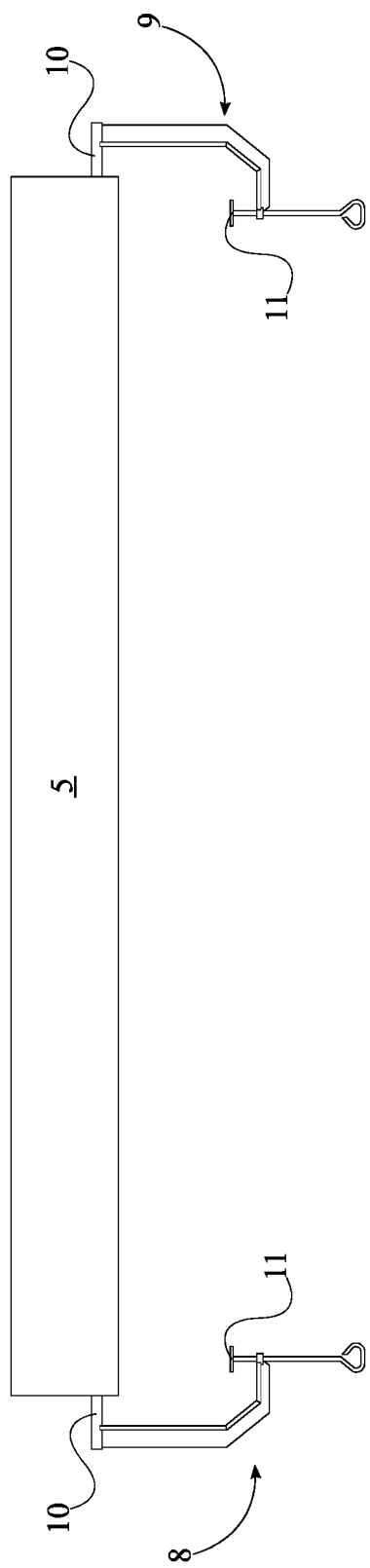
FIG. 3 is a left side view of the present invention.
Figure 5:
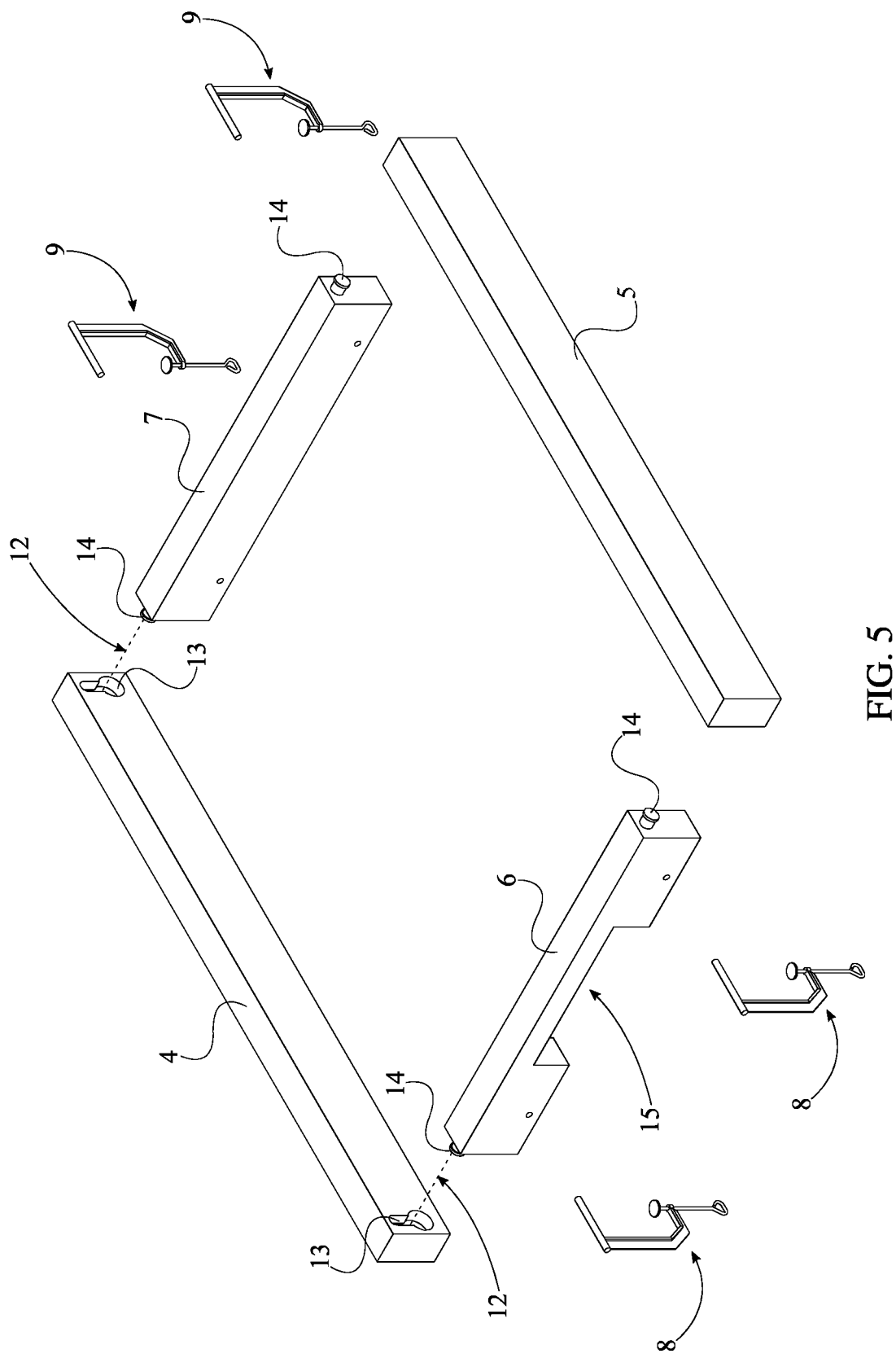
FIG. 5 is an exploded view of the present invention.

In the preferred embodiment of the present invention, the at least one first clamp 8 and the at least second first clamp 9 are C-clamps, as illustrated in FIG. 3 and FIG. 5. The proximal jaw 10 of the at least one first clamp 8 and the at least second first clamp 9 are each a threaded rod that traverses into the first end segment 2 and the second end segment 3, respectively. The distal jaw 11 of the at least one first clamp 8 and the at least one second clamp 9 each comprises rubberized surface that traverses across a swivel head of the at least one first clamp 8 and the at least one second clamp 9. The rubberized surfaces increase the friction between the at least one first clamp 8 and the at least one second clamp 9 with that of the grooming table, thereby reinforcing the mounting of the present invention onto the grooming table.

In the preferred embodiment of the present invention, the plurality of wall segments 1 further comprises a first lengthwise segment 4, a second lengthwise segment 5, a first widthwise segment 6, and a second widthwise segment 7, as illustrated in FIG. 5. The first lengthwise segment 4 and the second lengthwise segment 5 surround the lengthwise edges of a grooming table. The first widthwise segment 6 and the second widthwise segment 7 surrounding the widthwise edges of the grooming table. More specifically, the first widthwise segment 6 and the second widthwise segment 7 are the first end segment 2 and the second end segment 3, respectively. In an alternate embodiment of the present invention, the first end segment 2 is the first lengthwise segment 4, and the second end segment 3 is the second lengthwise segment 5. The first lengthwise segment 4 and the second lengthwise segment 5 are positioned parallel and offset to each other. Moreover, the first widthwise segment 6 and the second widthwise segment 7 are positioned parallel and offset from each other. This configuration accommodates the typical rectangular shape of a dog grooming table.

As shown in FIG. 5, the plurality of wall segments 1 is secured to one another via a plurality of interlocking fasteners 12. An arbitrary segment is detachably attached to an adjacent segment by a corresponding fastener from the plurality of interlocking fasteners 12. The arbitrary segment and the adjacent segment is any pair from the plurality of wall segments 1. Each of the plurality of interlocking fasteners 12 preferably comprises a slot 13 and a tab 14. The slot 13 houses the tab 14, and the tab 14 connects the arbitrary segment to the adjacent segment. The tab 14 is terminally connected to the arbitrary segment, and the slot 13 is terminally traversing into the adjacent segment. The slot 13 is engaged by the tab 14, thereby fastening the arbitrary segment and the adjacent segment to each other. In the preferred embodiment of the present invention, the plurality of interlocking fasteners 12 is connected across the same surface of each arbitrary segment and each adjacent segment, respectively.

Figure 2:
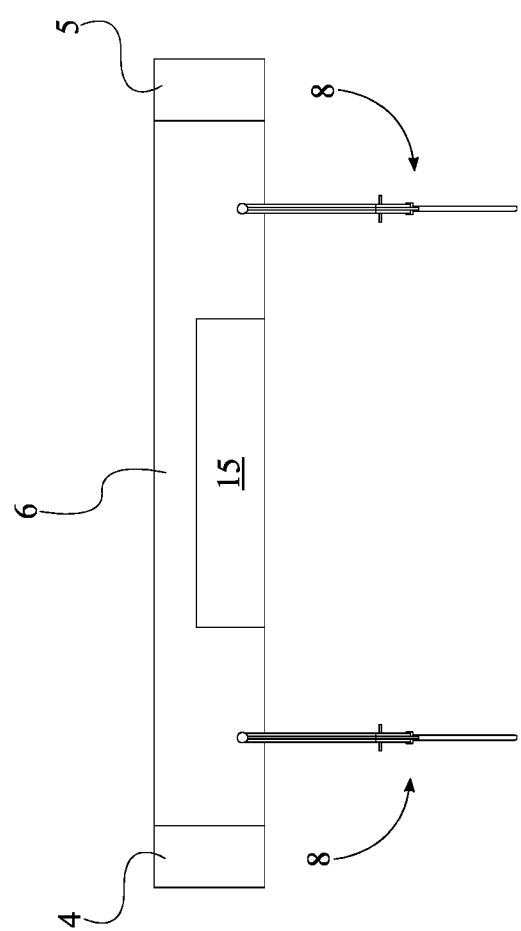
FIG. 2 is a front side view of the present invention.

In order to accommodate the grooming arm of a dog grooming table, the preferred embodiment of the present invention further comprises a cantilever-receiving channel 15, illustrated in FIG. 2. The cantilever-receiving channel 15 traverses into the closed-shape configuration for the plurality of wall segments 1, allowing the base of the adjustable arm of the grooming table to traverse through the plurality of wall segments 1 while preserving the closed-shape configuration. More specifically, the cantilever-receiving channel 15 is adjacent the surface of the plurality of wall segments 1 that presses against the grooming table.

In order to secure the present invention onto a grooming table, the user simply engages the proximal jaw 10 of the at least one first clamp 8 and the proximal jaw 10 of the at least one second clamp 9 to the first end segment 2 and the second end segment 3, respectively. The user then aligns the first end segment 2 and the second end segment 3 with the opposing edges of the grooming table. More specifically, the user aligns the grooming arm within the cantilever-receiving channel 15. The user engages the distal jaw 11 of the at least one first clamp 8 and the distal jaw 11 of the at least one second clamp 9 until the distal jaws 11 press against the table. In order to define the closed-shape configuration, the user inserts the tabs 14 into the slots 13 of each of the plurality of interlocking fasteners 12 as to secure the remaining plurality of wall segments 1. In the event the dog cannot maneuver over the plurality of wall segments 1 in order to get off of the dog grooming table, the user simply removes one of the plurality of wall segments 1 from the closed-shape configuration.

Although the invention has been explained in relation to its preferred embodiment, it is to be understood that many other possible modifications and variations can be made without departing from the spirit and scope of the invention as hereinafter claimed.

What is claimed is:

1. A dog grooming table barrier comprises:
    a plurality of wall segments;
    at least one first clamp;
    at least one second clamp;
    the plurality of wall segments comprises a first end segment and a second end segment;
    the at least one first clamp and the at least one second clamp each comprises a proximal jaw and a distal jaw;
    the plurality of wall segments being arranged into a closed-shape configuration;
    the plurality of wall segments being terminally and detachably attached to each other;
    the first segment and the second segment being positioned opposite to each other about the closed-shape configuration; and
    the proximal jaw of the at least one first clamp being engaged to the first end segment; and
    the proximal jaw of the at least one second clamp being engaged to the second end segment.

2. The dog grooming table barrier as claimed in claim 1 comprises:
    the plurality of wall segments further comprises a first lengthwise segment, a second lengthwise segment, a first widthwise segment, and a second widthwise segment;
    the first lengthwise segment and the second lengthwise segment being positioned parallel and offset from each other; and
    the first widthwise segment and the second widthwise segment being positioned parallel and offset from each other.

3. The dog grooming table barrier as claimed in claim 2, wherein the first end segment is the first widthwise segment, and wherein the second end segment is the second widthwise wall.

4. The dog grooming table barrier as claimed in claim 2, wherein the first end segment is the first lengthwise segment, and wherein the second end segment is the second lengthwise segment.

5. The dog grooming table barrier as claimed in claim 1 comprises:
    a plurality of interlocking fasteners; and
    an arbitrary segment being detachably attached to an adjacent segment by a corresponding fastener from the plurality of interlocking fasteners, wherein the arbitrary segment and the adjacent segment is any pair from the plurality of wall segments.

6. The dog grooming table barrier as claimed in claim 5 comprises:
    each of plurality of interlocking fasteners comprises a slot and a tab;
    the tab being terminally connected to the arbitrary segment;
    the slot terminally traversing into the adjacent segment; and
    the slot being engaged by the tab.

7. The dog grooming table barrier as claimed in claim 1 comprises:
    a cantilever-receiving channel; and
    the cantilever-receiving channel traversing into the closed-shape configuration for the plurality of wall segments.

8. A dog grooming table barrier comprises:
    a plurality of wall segments;
    at least one first clamp;
    at least one second clamp;
    a plurality of interlocking fasteners;
    a cantilever-receiving channel;
    the plurality of wall segments comprises a first end segment and a second end segment;
    the at least one first clamp and the at least one second clamp each comprises a proximal jaw and a distal jaw;

the plurality of wall segments being arranged into a closed-shape configuration;

the plurality of wall segments being terminally and detachably attached to each other;

the first segment and the second segment being positioned opposite to each other about the closed-shape configuration;

the proximal jaw of the at least one first clamp being engaged to the first end segment;

the proximal jaw of the at least one second clamp being engaged to the second end segment;

an arbitrary segment being detachably attached to an adjacent segment by a corresponding fastener from the plurality of interlocking fasteners, wherein the arbitrary segment and the adjacent segment is any pair from the plurality of wall segments; and the cantilever-receiving channel traversing into the closed-shape configuration for the plurality of wall segments.

9. The dog grooming table barrier as claimed in claim 8 comprises:

the plurality of wall segments further comprises a first lengthwise segment, a second lengthwise segment, a first widthwise segment, and a second widthwise segment;

the first lengthwise segment and the second lengthwise segment being positioned parallel and offset from each other; and the first widthwise segment and the second widthwise segment being positioned parallel and offset from each other.

10. The dog grooming table barrier as claimed in claim 9, wherein the first end segment is the first widthwise segment, and wherein the second end segment is the second widthwise wall.

11. The dog grooming table barrier as claimed in claim 9, wherein the first end segment is the first lengthwise segment, and wherein the second end segment is the second lengthwise segment.

12. The dog grooming table barrier as claimed in claim 8 comprises:

each of plurality of interlocking fasteners comprises a slot and a tab;

the tab being terminally connected to the arbitrary segment;

the slot terminally traversing into the adjacent segment; and the slot being engaged by the tab.

* * * * *